E. PARRADEE.
CLAMPING DEVICE.
APPLICATION FILED OCT. 22, 1917.
1,273,658. Patented July 23, 1918.
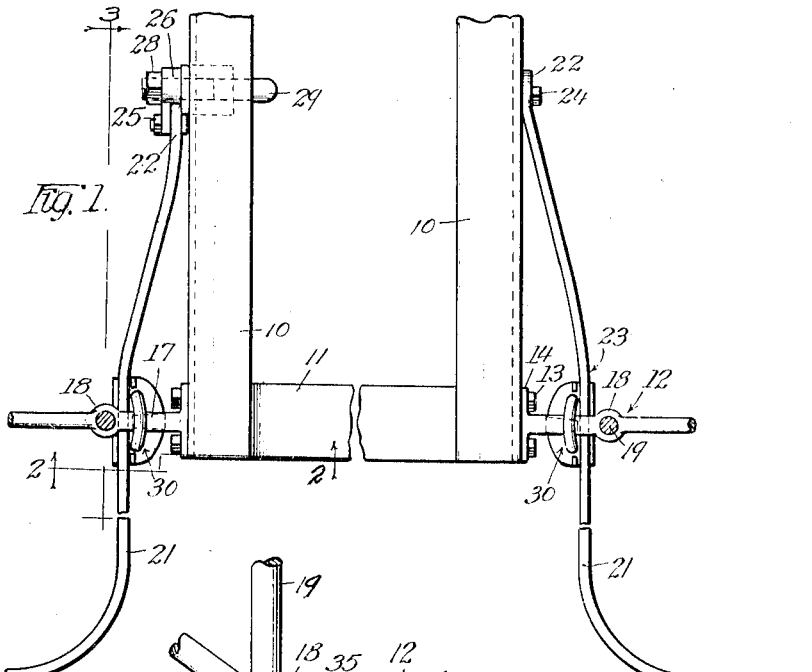
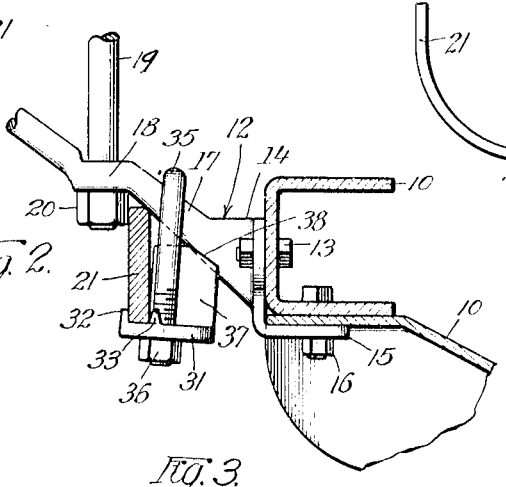
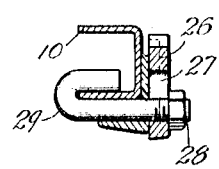
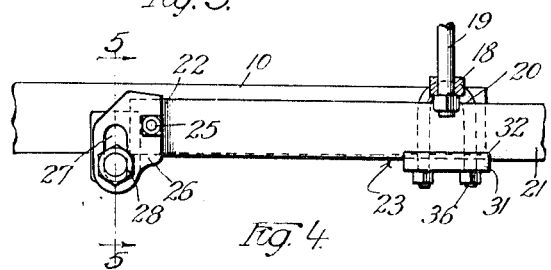
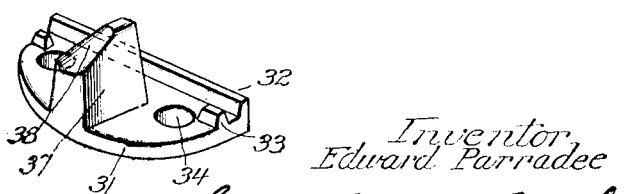
Inventor
Edward Parradee

UNITED STATES PATENT OFFICE.

EDWARD PARRADEE, OF CHICAGO, ILLINOIS.

CLAMPING DEVICE.

1,273,658.     Specification of Letters Patent.     Patented July 23, 1918.

Application filed October 22, 1917. Serial No. 197,877.

*To all whom it may concern:*

Be it known that I, EDWARD PARRADEE, a citizen of the United States, residing at Chicago, in the county of Cook and State of Illinois, have invented certain new and useful Improvements in Clamping Devices, of which the following is a specification.

This invention relates to improvements in clamping devices, and more particularly to brackets for securing a bumper to the fender bracket of a Ford automobile.

One of the objects of my invention is to provide a bumper attachment which may be clamped rigidly to the fender bracket of a car, securing the bumper firmly in place in such a manner as will prevent the bumper from shifting position under the constant vibration and hard usage to which it is subjected.

Another object is the provision of an efficient, inexpensive bumper fastener which may be readily attached by an unskilled mechanic without the necessity of adjustment to insure proper positioning of the bumper bar.

Still other and further objects will become readily apparent to those skilled in the art from a consideration of the following description and drawing wherein:—

Figure 1 is a plan view of the front end of a motor car frame, parts being broken away, showing my improved bracket in use.

Fig. 2 is a vertical sectional view on the line 2—2 of Fig. 1.

Fig. 3 is a vertical sectional view on the line 3—3 of Fig. 1.

Fig. 4 is a perspective view of the bracket plate detached, and;

Fig. 5 is a vertical sectional view on the line 5—5 of Fig. 3.

The common method of attaching a bumper bar to the front of a motor car is by clamping the rearwardly extending arms of the bumper to the side members of the frame which project beyond the radiator. Considerable difficulty is encountered in mounting a bumper upon the front end of a Ford automobile due to the fact that the side frame members do not project beyond the radiator and therefore do not have the downwardly curving horns usually found on cars having semi-elliptical front springs. This difficulty, I have overcome, without drilling holes in the frame as is sometimes done, by providing a clamp for securing the rearwardly extending arm of the bumper at an intermediate point directly to the fender bracket of the car, and at its rear end clamping it to the frame.

In the drawings the numerals 10—10 indicate the side sills or frame members of a motor car connected at their front ends by the transverse frame member 11. The car illustrated is a Ford, and my invention is particularly adapted for this make of machine, though it may obviously be used with other cars having frames of similar construction. Secured by bolts 13 to the forward ends of the channels 10 are the outwardly extending fender and lamp brackets 12. Each bracket is flattened out as at 14 for engagement with the side of the channel on which it is mounted and carries a lip 15 extending under the channel and secured by bolts 16 to the lower flange of the channel. The bracket extends from the enlarged portion 14 outwardly and upwardly as at 17, being round in cross-section, and at a point spaced outwardly from the frame a few inches, is flattened out as at 18 to provide sufficient material to have formed therein a vertical opening in which the upright lamp post 19 is carried. The lamp bracket 19 is clamped in position by a nut 20 threaded on its lower end. The parts thus far described are standard equipment upon Ford automobiles.

The bumper bar which is to be attached to the car is provided with a pair of rearwardly extending supporting arms 21 which in the present instance are of rectangular cross-section with their greatest dimension lying in a vertical plane. The rear ends 22 of the arms are positioned close to the side frame members and at an intermediate point, opposite the front end of the frame, are bowed out somewhat as at 23 to lie beneath the fender brackets 12 and at their outer sides abut against the lamp post nuts 20. Holes are drilled in the rear ends of the arms and at the left hand side of the car (looking forward) the bolt 24, forming a part of the steering gear support, engages the hole in the left hand arm. The rear end of the other arm is secured by bolt 25 to a bracket 26 having a vertical slot 27 for engagement by the hook bolt 28.

The hooked end 29 of bolt 28 engages the inner edge of the lower flange of channel 10 and securely fastens this end of the right hand arm in position. The object of making at least one side vertically adjustable is to provide means for adjusting the horizontal position of the bumper bar.

A pair of clamps indicated in general at 30 in Fig. 1 secure the arms to the fender brackets. Each clamp comprises a semicircular plate 31 having an upstanding lip 32 upon its outer straight edge and a pair of inwardly spaced lugs 33 between which to receive the lower edge of the bumper arm 21. Holes 34 are formed in the plate to receive the threaded ends of a U bolt 35 which extends over the fender bracket 12. Nuts 36 are threaded on the ends of the U bolt to clamp the plate up against the under edge of the arm and hold it rigidly up against the fender bracket and inner side of the lamp-post nut 20. A block 37 extends upwardly from plate 31 between the holes 34 and is beveled off at the top inner edge 38 at such an angle as to prevent a wide contact area to the underside of the fender bracket, this surface being transversely curved to conform to the rounded surface of the bracket.

While I have illustrated and described but a single embodiment of my invention it will be obvious to those skilled in the art that many changes may be made therein without departing from the spirit of the invention or the scope of the appended claims.

Having described my invention, what I claim is:—

1. The combination with the inclined member of a fender bracket of a motor car, and the rearwardly extending arm of a bumper underlying the bracket; of a clamp comprising a plate underlying the arm, a U bolt extending over the inclined member of the top of the bracket with its legs extending through the plate, and nuts threaded on the ends of the bolt to clamp the arm against the bracket, wedging the clamp against the enlarged part of said member by the effect of said inclined part.

2. The combination with the fender bracket of a motor car having a projection on the lower side thereof, and the rearwardly extending arm of a bumper underlying the bracket with its outer edge abutting against the projection; of a clamp, comprising a plate underlying the arm and having a centrally positioned upwardly extending lug for engagement with the bracket inside the arm, and a U bolt extending over the bracket and through the plate to clamp the arm and bracket in fixed relationship.

3. The combination with the fender bracket of a motor car having a projection on the lower side thereof, and the rearwardly extending arm of a bumper underlying the bracket with its outer edge abutting against the projection; of a clamp, comprising a plate underlying the arm, and having a centrally positioned upwardly extending lug for engagement with the bracket inside the arm, ribs on the outer upper surface of the plate for engagement with each side of the lower edge of the arm, and a U bolt extending over the bracket and through the plate to clamp the arm and bracket in fixed relationship.

In testimony whereof I hereunto set my hand in the presence of two subscribing witnesses.

EDWARD PARRADEE.

In the presence of—
IRENE L. HENZE,
GEO. H. VAN STEDUM.